United States Patent [19]
Dwyer et al.

[11] 3,848,864
[45] Nov. 19, 1974

[54] FINGERS EMPLOYING INSERTS TO SUPPORT WORK PIECES IN A FLOW SOLDER MACHINE

[75] Inventors: Gregory J. Dwyer, Livonia; Walla L. Ferris, Detroit, both of Mich.

[73] Assignee: International Telephone and Telegraph Corporation, New York, N.Y.

[22] Filed: Nov. 21, 1972

[21] Appl. No.: 308,534

[52] U.S. Cl.................. 269/46, 198/163, 228/37, 269/275
[51] Int. Cl.............................................. B23q 1/00
[58] Field of Search .......... 198/131, 163, 179, 180; 228/36, 37; 269/55, 46, 265, 268, 275, 285, 286, 296, 297, 298, 299, 302, 306, 317, 321 ME, 321 H

[56] References Cited
UNITED STATES PATENTS

| | | |
|---|---|---|
| 1,130,975 | 3/1915 | Hopper .......................... 269/275 |
| 2,473,643 | 6/1949 | Froblom ......................... 269/265 |
| 3,565,319 | 2/1971 | Eschenbrucher .................. 228/37 |

*Primary Examiner*—Roy Lake
*Assistant Examiner*—Mark S. Bicks
*Attorney, Agent, or Firm*—Delbert P. Warner; J. B. Raden

[57] ABSTRACT

Fingers are provided to support work pieces in a flow solder machine. Ledges are formed on the fingers enabling them to support pallets which in turn support work pieces of varying size and configuration at a positive work-line height for contact with a solder-wave. Inserts may be placed in the fingers to provide palletless positive work-line height control, thus assuring proper contact of selected individual workpieces with the solder wave, without requiring the use of a pallet.

8 Claims, 6 Drawing Figures

FINGERS EMPLOYING INSERTS TO SUPPORT WORK PIECES IN A FLOW SOLDER MACHINE

BACKGROUND OF THE INVENTION

1. Field of the Invention

The present invention relates to flow solder machines and to means for carrying printed circuit boards and similar work pieces in such machines. More particularly, it relates to fingers and means such as ledges, pallets and inserts of use in supporting printed circuit boards as they pass through flow solder machines.

2. Description of the Prior Art

The prior art includes flow-solder machines which incorporate heaters for heating solder to the molten state in a reservoir, pumps for forcing the molten solder to flow over a barrier to produce an artificial "wave" and transporters to transport a preheated circuit board into contact with the solder "wave", enabling a thin layer of solder to adhere to the board. The resutling coating of solder provides an electrical path between electrical elements connected to the board.

A number of prior art machines include a movable conveyor arranged along each side of the machine to support the ends of printed circuit boards and in this way achieve "palletless" operation. Support for the boards on the conveyor is provided by a plurality of "fingers" which grip the printed circuit boards on each side and carry them along as they are first pre-heated and then brought into contact with the molten solder.

The prior art fingers in such machines have included metal pieces shaped to contact the edges of the printed circuit boards and support them as they move through the soldering machine. Some of the metal pieces have been designated as "slugs" having slots which engage the printed circuit boards. Other prior art fingers have made use of metallic springs and metallic rests to support and secure boards for soldering.

The fingers in the prior art devices all require cleaning or replacement due to damage caused by the build-up of solder flux and sometimes bits of solder and oil. To correct this situation it is necessary to shut down the machines, cool them off and remove and clean, or replace, each of several hundred fingers. This procedure is costly from the standpoint of time used and material (fingers) replaced.

SUMMARY OF THE INVENTION

In view of the foregoing, it is an object of the present invention to provide improved fingers for use in the conveyor of a flow solder machine which may be readily repaired, thereby reducing down-time and the cost of maintaining the machine. Another object includes the provision of fingers for a wave-solder machine which assure a stable work-line height. Yet another object includes the provision of fingers which support boards to be soldered and, at the same time, continue to support the boards when they change volume due to heat variations. A further object includes the provision of fingers causing the reduction of flux and solder build-up. A further object is the provision of fingers capable of providing supports for work pieces in a flow solder machine which automatically compensate for deviations in the dimensions of the work pieces. Yet another object is the provision of fingers incorporating elements which can be readily replaced to restore the fingers to operating condition when they are clogged up with flux. Still another object is to provide fingers having inserts which may be replaced readily to enable the fingers to support a variety of boards and carriers. Yet a further object is to reduce the cost of flow soldering by using novel arrangements of fingers and finger inserts. Yet another object is to provide fingers enabling a pallet to be supported above a work-line in a position such that work piece may be supported by the pallet at the work-line. Still another object is to provide fingers enabling either top loading or end loading of a pallet in a wave solder machine. The foregoing objects and others ancillary thereto may be realized in a flow solder machine by use of ledges on novel fingers and ledges on novel fingers incorporating special inserts. The novel fingers in a preferred embodiment are formed of a metal such as caSt or extruded aluminum which has been finished with an anodized or cermelox hardcoat. Pallets may be supported directly on properly located ledges. At least one opening is formed through each finger to engage and hold an insert. A ledge formed at the juncture of the finger and the insert serves to support and secure the part to be soldered without the use of a pallet.

BRIEF DESCRIPTION OF THE DRAWINGS

The above mentioned and other features and objects of this invention and the manner of obtaining them will become more apparent, and the invention itself will be best understood by reference to the following description of an embodiment of the invention taken in conjunction with the accompanying drawings, in which.

DESCRIPTION OF PREFERRED EMBODIMENTS

Figure 1:
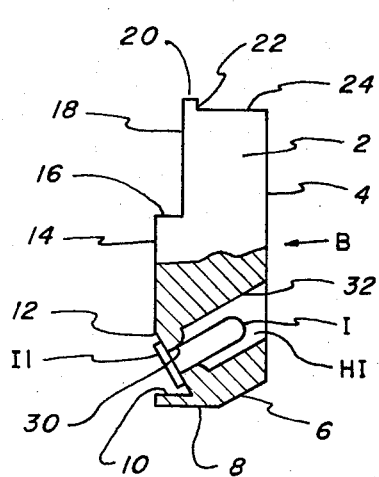
FIG. 1 is a view in partial section of an embodiment of a finger according to the invention.

Turning now to FIG. 1, an example of a finger, in accordance with the invention, is indicated in partial section by the arrow at B.

Figure 2:
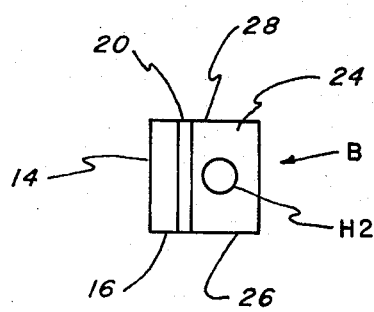
FIG. 2 is a top view of the embodiment shown in FIG. 1.

The principal part of the block is formed by the body 2 of a solid bounded by a plurality of flat surfaces indicated by numbers at 4, 6, 8, 10, 12, 14, 16, 18, 20, 22 and 24 in FIG. 1 and 26 and 28 in FIG. 2. An opening, consisting of a series of holes of different diameters, is indicated at H1. A resilient insert I is shown in position in the opening H1.

In a preferred embodiment, the holes forming the opening H1 will include an opening at 30 of sufficient diameter to permit the insert I to pass therethrough. The head I1 of the insert will form, with the surface 10, a ledge against which a printed circuit board or other work piece may be inserted. The head I1, by virtue of its resiliency, will enable the work piece to expand and contract and will absorb the changes in dimensions.

The insert I may be placed in the position shown by putting its narrow tip through the opening 30 into the larger opening at 32. A collet chuck is pushed into the opening 32 to grasp the end of the insert which can then be pulled further into the opening 32, enabling the head I1 to engage the surface 12 and the insert to assume the position shown in FIG. 1.

FIG. 2 is a top view of the embodiment of FIG. 1, further illustrating the angular characteristics of the finger B and the position of a threaded hole H2 in the face 24. The threads in H2 may be used in securing the finger to a conveyor in a wave-solder machine.

Figure 3:
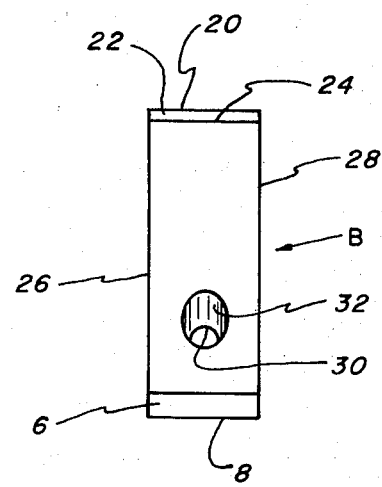
FIG. 3 is a side view of the embodiment of FIG. 1.

FIG. 3 is a side view of the block shown in FIG. 1 illustrating further aspects of an embodiment of the invention. In this view, various faces of the finger B are numbered in accordance with the numbering in the other views to further illustrate the character of the inventive device. In this view, the insert I has been omitted to enable the relative positions of the openings 30 and 32 to be shown.

Figure 4:
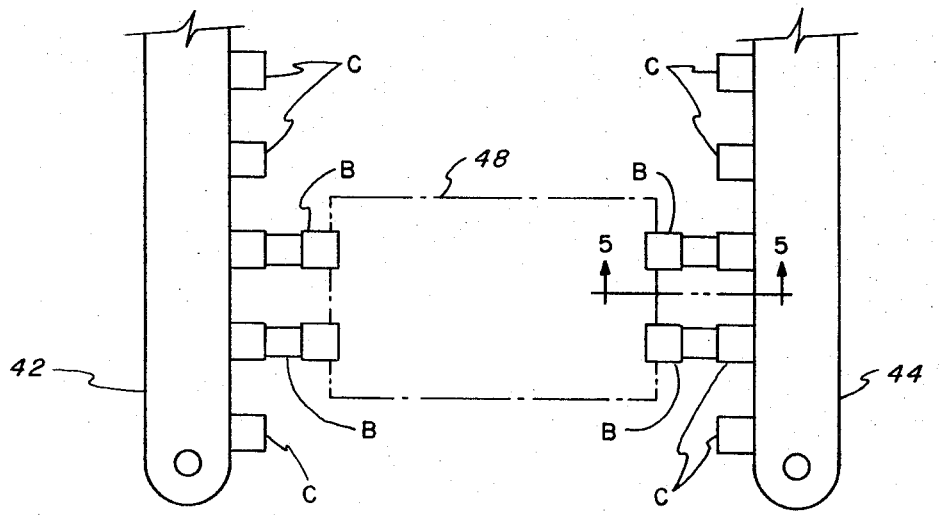
FIG. 4 is an elevation showing conveyor portions of a wave solder machine and relationships of fingers and workpieces thereto.

FIG. 4 is an elevation showing conveyor portions of a wave solder machine at 42 and 44. The conveyors each support a plurality of carriers, a few of which are indicated at C. In practice, each carrier C may be equipped with a finger, as indicated at B. The oppositely positioned fingers B may be aligned to engage a pallet as indicated by the dot-dash lines at 48.

Figure 5:
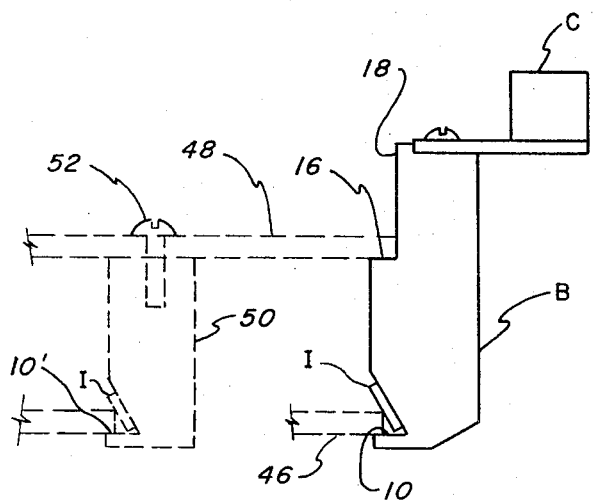
FIG. 5 shows details of relationships in FIG. 4 taken along the line 5—5 and arrangements of ledges, pallets and workpieces supported without pallets.

FIG. 5 is an enlarged view taken along the line 5—5 in FIG. 4. FIG. 5 illustrates further relationships between a carrier C, forming part of the conveyor 44, a finger B and either a printed circuit board 46 or a pallet 48. In this view, the printed circuit board rides on a ledge formed at the junction of the face 10 and the top of the insert I. A pallet 48 for supporting printed circuit boards of a variety of shapes and sizes at the work-line level corresponding to 10' is indicated by dash lines 48 in the figure. The pallet 48 may be supported on a ledge formed at the intersection of surfaces 16 and 18. The pallet may be adjusted to support boards of varying sizes by changing the horizontal distance between B and a block 50 through horizontal movement when screw 52 is loosened. The block 50 may be bored to retain an insert at I, thereby achieving the advantages of I in the block B.

Figure 6:
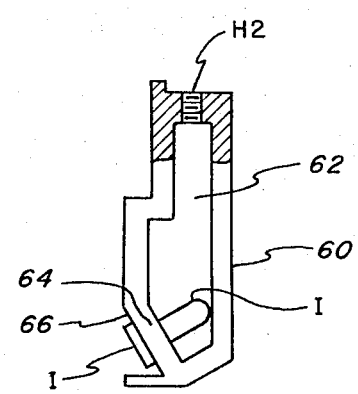
FIG. 6 is a view of a finger formed of a typical extruded piece.

It will be recognized that the fingers may take other forms, may be made of other materials and may be fabricated by other means without deviating from the spirit and scope of the invention. For example, the wall 60 in FIG. 6 and other structural elements might be eliminated to permit better access to the insert I without moving outside the scope of the invention. The block may preferably be formed of any rigid material which can be shaped and which will withstand the heat and use to which such fingers are subjected. The blocks may in a particular case be formed by extrusion, stamping, bending, casting or any other method which results in the formation of a desired shape.

We claim:

1. A finger for use in supporting a workpiece in a flow solder machine comprising a block, means associated with said block enabling the block to be fastened to a movable conveyor, means associated with said block enabling it, in cooperation with a plurality of similar blocks which are fastened to a movable conveyor, to support a workpiece and thus enable the workpiece to be carried through the work stations of a flow solder machine, said block, and each similar block, including means making it independently removable from said movable conveyor for cleaning and repair and independently replaceable thereon, said means to support a workpiece including an opening in said block, and in each similar block, and a resilient insert in said opening, the block terminating at one end in a ledge having a substantially flat face which may be drilled to enable the block to be locked to the movable conveyor of a flow solder machine, the block terminating at the other end in a ledge shaped to provide a seat against which a workpiece may rest, and the opening in said block being formed through the block adjacent the other end to receive the resilient insert, said seat and said resilient insert together forming a support for a workpiece.

2. A finger as claimed in claim 1, in which the opening in said block is formed by a series of adjoining concentric openings of successively larger size, the smallest opening having a diameter large enough to receive the body of a resilient insert, and the largest opening having a diameter large enough to receive a collet chuck, whereby a collet chuck may be inserted into the largest opening to seize the body of an insert and pull it through the smallest opening.

3. A finger as claimed in claim 1, in which the block is formed of thin walls around a central opening, and the resilient insert extends into the central opening through the opening in said block, whereby the insert may be pulled through the opening in said block by means of a tool inserted through the central opening.

4. A finger for use in supporting a workpiece in a flow solder machine comprising a block, means associated with said block enabling the block to be fastened to a movable conveyor, means associated with said block enabling it, in cooperation with a plurality of similar blocks which are fastened to a movable conveyor, to support a workpiece and thus enable the workpiece to be carried through the work stations of a flow solder machine, said block, and each similar block, including means making it independently removable from said movable conveyor for cleaning and repair and independently replaceable thereon, said means to support a workpiece including a ledge on said block, and each similar bloc, to receive and support a workpiece in contact with a solder-wave at a positive work-line height, said means to enable the block to be fastened to a movable conveyor including a ledge having a face into which a hole is drilled substantially at right angles, said ledge terminating along one side in a step rising above the face of the ledge and substantially at right angles to the face, and said step providing a base to enable the finger to be held free of motion on the conveyor of a flow solder machine.

5. A finger for use in supporting a workpiece in a flow solder machine comprising a block, means associated with said block enabling the block to be fastened to a movable conveyor, means associated with said block enabling it, in cooperation with a plurality of similar blocks which are fastened to a movable conveyor, to support a workpiece and thus enable the workpiece to be carried through the work stations of a flow solder machine, said block, and each similar block, including means making it independently removable from said movable conveyor for cleaning and repair and independently replaceable thereon, said means to support a workpiece including an opening in said block, and in each similar block, and a resilient insert in said opening, the means to enable the block to be fastened to a movable conveyor including a ledge having a face into which a hole is drilled at right angles, said ledge terminating along one side in a step rising above the face of the ledge and at right angles to the face, and said step providing a base to enable the finger to be held free of motion on the conveyor of a flow solder machine.

6. A finger as claimed in claim 5, in which the opening in said block is formed by a series of adjoining concentric openings of successively larger size, the smallest opening having a diameter large enough to receive the body of a resilient insert, and the largest opening having a diameter large enough to receive a collet chuck, whereby a collet chuck may be inserted into the largest opening to seize the body of an insert and pull it through the smallest opening.

7. A finger as claimed in claim 5, in which the block is formed of thin walls around a central opening, and the resilient insert extends into the central opening through the opening in said block, whereby the insert may be pulled through the opening in said block by means of a tool inserted through the central opening.

8. A finger as claimed in claim 5, in which the block is formed of thin walls around a central opening, and the resilient insert extends into the central opening through the opening in said block, whereby the insert may be pulled through the opening in said block by means of a tool inserted through the central opening.

* * * * *